(12) United States Patent
Kato et al.

(10) Patent No.: US 10,359,839 B2
(45) Date of Patent: Jul. 23, 2019

(54) PERFORMING OUTPUT CONTROL BASED ON USER BEHAVIOUR

(71) Applicant: SONY CORPORATION, Tokyo (JP)

(72) Inventors: Ayumi Kato, Tokyo (JP); Tsubasa Tsukahara, Tokyo (JP); Jun Kimura, Kanagawa (JP)

(73) Assignee: SONY CORPORATION, Tokyo (JP)

(*) Notice: Subject to any disclaimer, the term of this patent is extended or adjusted under 35 U.S.C. 154(b) by 5 days.

(21) Appl. No.: 15/025,512

(22) PCT Filed: Aug. 5, 2014

(86) PCT No.: PCT/JP2014/070652
§ 371 (c)(1),
(2) Date: Mar. 28, 2016

(87) PCT Pub. No.: WO2015/068440
PCT Pub. Date: May 14, 2015

(65) Prior Publication Data
US 2016/0231808 A1 Aug. 11, 2016

(30) Foreign Application Priority Data
Nov. 8, 2013 (JP) .................. 2013-231711

(51) Int. Cl.
*G06F 3/01* (2006.01)
*G06F 3/16* (2006.01)
*G02B 27/01* (2006.01)

(52) U.S. Cl.
CPC ........... *G06F 3/012* (2013.01); *G02B 27/017* (2013.01); *G06F 3/16* (2013.01); *G06F 3/165* (2013.01)

(58) Field of Classification Search
CPC ...... G02B 27/0176; G09G 5/00; H04N 13/04; H04N 7/18; H04B 1/08
See application file for complete search history.

(56) References Cited

U.S. PATENT DOCUMENTS

| 2012/0206334 | A1* | 8/2012 | Osterhout | G06F 1/163 345/156 |
| 2012/0293773 | A1* | 11/2012 | Publicover | A61B 3/113 351/210 |
| 2014/0036127 | A1* | 2/2014 | Pong | H04R 1/028 348/333.01 |
| 2016/0048211 | A1* | 2/2016 | Raffle | G06F 3/017 715/863 |

FOREIGN PATENT DOCUMENTS

| JP | 2006-333355 A | 12/2006 |
| JP | 2011-197992 A | 10/2011 |
| JP | 2013-093705 A | 5/2013 |

* cited by examiner

*Primary Examiner* — Towfiq Elahi
(74) *Attorney, Agent, or Firm* — Chip Law Group

(57) ABSTRACT

An information processing apparatus includes an estimating unit configured to estimate behavior of a user by comparing data detected by a detecting unit worn on a head of the user and configured to detect motion of the head with a behavior characteristic amount calculated based on learning data, and a control unit configured to perform control according to the behavior estimated by the estimating unit.

8 Claims, 12 Drawing Sheets

FIG. 11
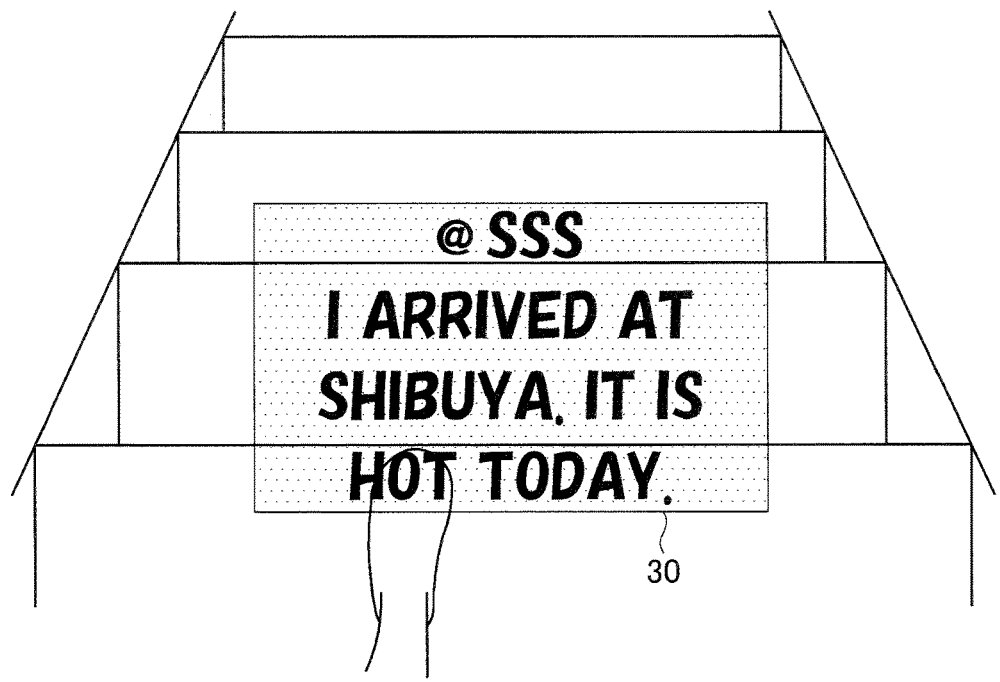
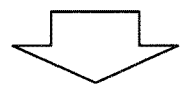
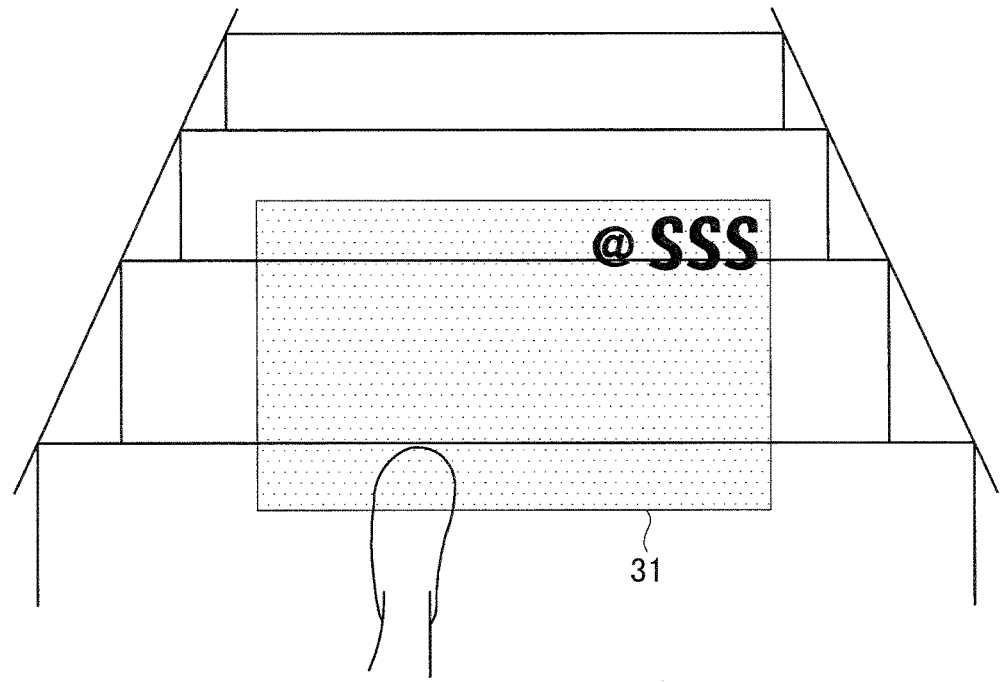

FIG. 12
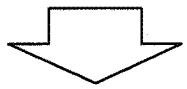
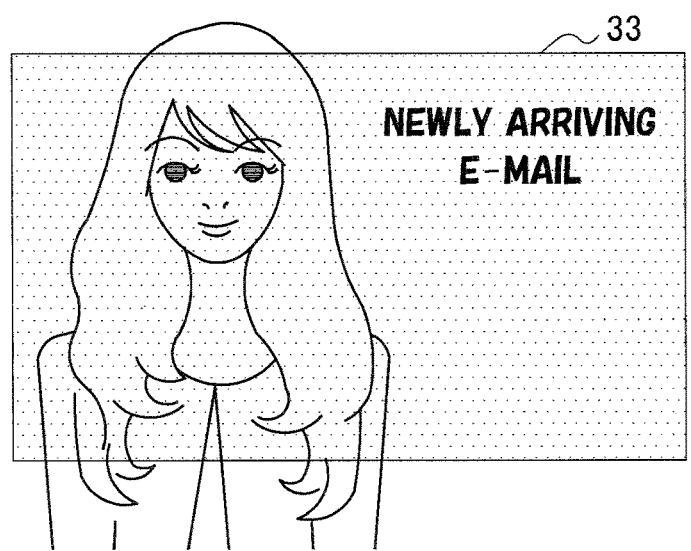

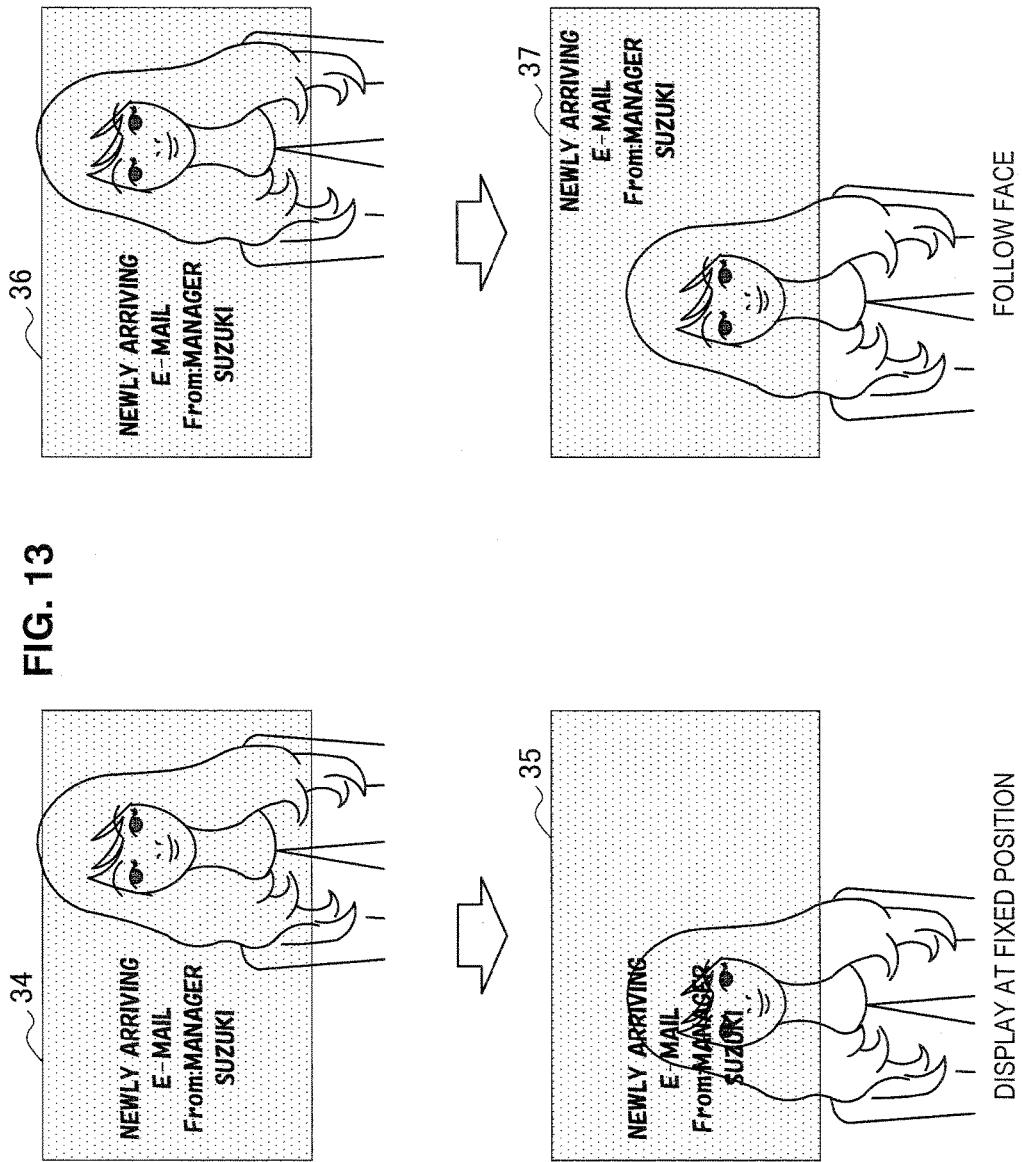

PERFORMING OUTPUT CONTROL BASED ON USER BEHAVIOUR

TECHNICAL FIELD

The present disclosure relates to an information processing apparatus, a control method and a program.

BACKGROUND ART

In the related art, behavior recognition of a user using a mobile phone terminal or a smartphone typically uses acceleration of gravity mounted on the mobile phone terminal or the smartphone.

For example, the following Patent Literature 1 discloses using a mobile terminal, or the like, such as a mobile phone, a PDA and a smartphone as a behavior recording apparatus and using a latitude and longitude acquisition sensor such as an acceleration sensor, a gyro sensor and a magnetic sensor as a sensor which senses conditions and behavior of a user holding the apparatus.

CITATION LIST

Patent Literature

Patent Literature 1: JP 2013-003649A

SUMMARY OF INVENTION

Technical Problem

However, when a mobile phone terminal, a smartphone, or the like, is used, because how the terminal is held or how the terminal is used is not uniformly determined, types of behavior of the user which can be estimated are limited. Further, for the same reason, a number of pieces of sensor data is required to improve estimation accuracy of user behavior.

Therefore, the present disclosure proposes an information processing apparatus, a control method and a program which enable estimation of user behavior based on motion of the head.

Solution to Problem

The present disclosure proposes an information processing apparatus including: an estimating unit configured to estimate behavior of a user by comparing data detected by a detecting unit worn on a head of the user and configured to detect motion of the head with a behavior characteristic amount calculated based on learning data; and a control unit configured to perform control according to the behavior estimated by the estimating unit.

The present disclosure proposes a control method including: a step of estimating behavior of a user by comparing data detected by a detecting unit worn on a head of the user and configured to detect motion of the head with a behavior characteristic amount calculated based on learning data; and a step of performing control according to the estimated behavior.

The present disclosure proposes a program for causing a computer to function as: an estimating unit configured to estimate behavior of a user by comparing data detected by a detecting unit worn on a head of the user and configured to detect motion of the head with a behavior characteristic amount calculated based on learning data; and a control unit configured to perform control according to the behavior estimated by the estimating unit.

Advantageous Effects of Invention

As described above, according to the present disclosure, it is possible to estimate user behavior based on motion of the head.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 11 is a diagram illustrating one example of display control when it is estimated that the user is going up or down stairs.

FIG. 12 is a diagram illustrating an example of a display screen when it is estimated that the user is having a conversation with a person.

FIG. 13 is a diagram for explaining a case where communication is activated by control of a display position.

DESCRIPTION OF EMBODIMENT

Hereinafter, a preferred embodiment of the present disclosure will be described in detail with reference to the appended drawings. In this specification and the drawings, elements that have substantially the same function and structure are denoted with the same reference signs, and repeated explanation is omitted.

Further, the description will be provided in the following order.

1. Outline of Behavior Estimating System According to One Embodiment of the Present Disclosure
2. Basic Configuration
2-1. Configuration of Information Processing Apparatus
2-2. Configuration of Server
3. Operation Processing
3-1. Characteristic Amount Learning Processing
3-2. Behavior Estimation Processing 4. Output Control
4-1. Display Control for Avoiding Danger
4-2. Activation of Communication
4-3. Application to Application Program
5. Conclusion

Figure 1:
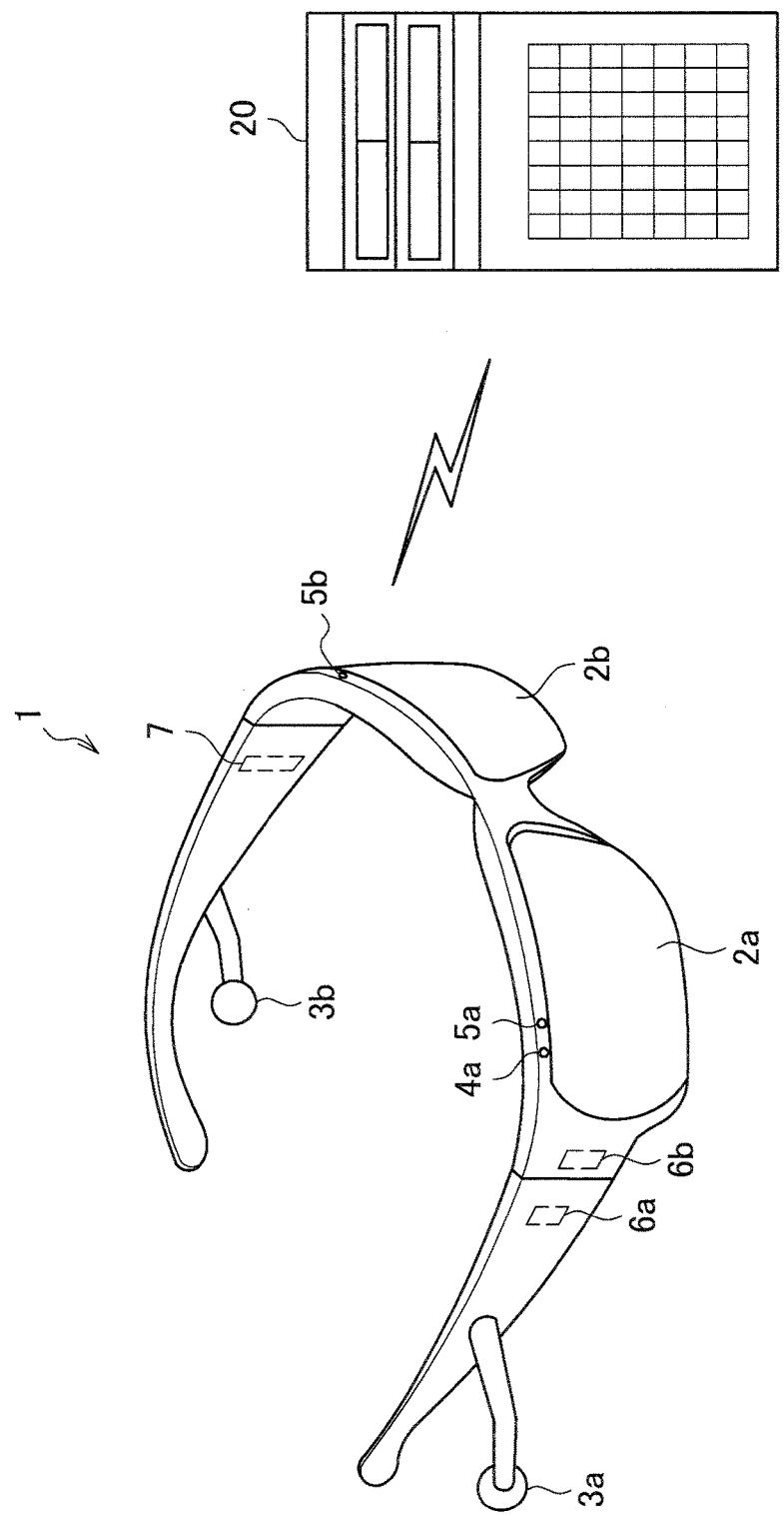
FIG. 1 is a diagram for explaining outline of a behavior estimating system according to one embodiment of the present disclosure.

1. Outline of Behavior Estimating System According to One Embodiment of the Present Disclosure First, outline of a behavior estimating system according to one embodiment of the present disclosure will be described with reference to FIG. 1. As illustrated in FIG. 1, the behavior estimating system according to the present embodiment includes an information processing apparatus 1 worn on the head of a user and a server 20.

The information processing apparatus 1 is a glasses-type head mounted display (HMD) as illustrated in FIG. 1, and worn on the user by, for example, arms extending toward the both sides of the head being hung on the both auditory capsules. Further, the information processing apparatus 1 (glasses-type HMD) is configured so that a pair of display units 2a and 2b for a left eye and a right eye are disposed in front of the both eyes of the user, that is, at positions where lenses of normal glasses are located. Hereinafter, when it is not necessary to distinguish between the display units 2a and 2b, both are collectively referred to as a display unit 2.

At the display unit 2, for example, a picked up image of real space picked up with an imaging lens 4a is displayed, or an image is displayed so as to be seen as if the image were superimposed on an object of real space. Further, the display unit 2 may be a transmission type display unit, and when the display unit 2 is put into a through state, that is, a transparent or semi-transparent state by the information processing apparatus 1, even if the user always wears the information processing apparatus 1 like glasses, no obstacle occurs in a normal life.

Further, at the information processing apparatus 1, a head sensor system such as a gravity acceleration sensor 6a and a gyro sensor 6b for detecting motion of the head of the user while the information processing apparatus 1 is worn on the user is provided. It should be noted that the head sensor system is not limited to the gravity acceleration sensor 6a and the gyro sensor 6b, and, for example, may be a geo-magnetic sensor, or the like.

Further, at the information processing apparatus 1, a vibrating unit 7 for vibrating the information processing apparatus 1 is mounted.

Further, as illustrated in FIG. 1, the above-described imaging lens 4a is disposed to face forward so as to pick up an image in a viewing direction of the user as a subject direction in a state where the information processing apparatus 1 is worn on the user.

Further, at the information processing apparatus 1, a pair of earphone speakers 3a and 3b which can be inserted into a right porus acusticus and a left porus acusticus of the user in a state where the information processing apparatus 1 is worn are provided. Further, microphones 5a and 5b for collecting external sound are disposed at the right side of the display unit 2 for right eye and at the left side of the display unit 2 for left eye.

It should be noted that the appearance of the information processing apparatus 1 illustrated in FIG. 1 is one example, and there are various possible types of structures for allowing the information processing apparatus 1 to be worn on the user. The information processing apparatus 1 may be formed with a wearing unit which is typically a glasses-type unit or a head mounted type unit, and only has to at least detect motion of the head of the user.

Further, it is also possible to employ a configuration where one display unit 2 is provided so as to correspond to one eye as well as a configuration where a pair of display units 2 are provided so as to correspond to both eyes. Further, while the imaging lens 4a is disposed to face forward at the right eye side in the example illustrated in FIG. 1, the imaging lens 4a may be disposed at the left eye side or disposed at both sides. Further, the earphone speakers 3a and 3b do not have to be right and left stereo speakers, and one speaker may be provided to be worn on only one ear. Further, it is also possible to provide only one of the microphones 5a and 5b. Still further, it is possible not to provide the microphones 5a and 5b or the earphone speakers 3a and 3b.

Further, the information processing apparatus 1 can communicate with a server 20 and can transmit and receive data to and from the server 20.

(Background)

Here, with the technique of the related art in which behavior of the user is recognized using a gravity acceleration sensor, a latitude and longitude acquisition sensor, or the like, mounted on the mobile phone terminal, the smartphone, or the like, because how the mobile phone terminal, the smartphone, or the like, is held, or how the terminal is used is not uniformly determined, types of user behavior which can be estimated are limited. Further, for the same reason, a number of pieces of sensor data are required to improve estimation accuracy of user behavior.

Further, types of behavior which can be estimated (recognized) in the related art are mainly two patterns of behavior based on moving velocity data mainly relating to a body trunk of a person, such as "walking/running, movement using an automobile, movement using a train", and behavior based on coordinate data of the terminal, such as "viewing the terminal, putting the terminal". Further, the recognized behavior is utilized for record as a life log, reflection to an avatar application, or the like, and not utilized to give some feedback to the user according to the recognized behavior.

Therefore, in the present embodiment, by estimating user behavior based on motion of the head of the user using a head wearable device (for example, a glasses-type HMD) whose holding position is fixed, it is possible to robustly estimate behavior which is difficult to be recognized (estimated) with the related art. Specifically, for example, it is possible to estimate behavior associated with motion of the head such as "talking with a person", "having a meal", "taking a nap", or the like.

Further, because the head wearable device is always uniformly worn on the head, and how the terminal is held or how the terminal is used is not different depending on users, it is possible to solve a problem of an amount of learning data becoming vast due to how the smartphone, or the like, is held being different depending on users in the related art.

Further, by giving feedback to the user according to the estimated behavior, it is possible to realize a measure against danger occurring to the user who routinely wears the head wearable device, activation of communication, or the like.

The outline of the behavior estimating system according to one embodiment of the present disclosure has been described above. Subsequently, basic configurations of the information processing apparatus 1 and the server 20 included in the behavior estimating system according to the present disclosure will be sequentially described.

2. Basic Configuration

<2-1. Configuration of Information Processing Apparatus

Figure 2:
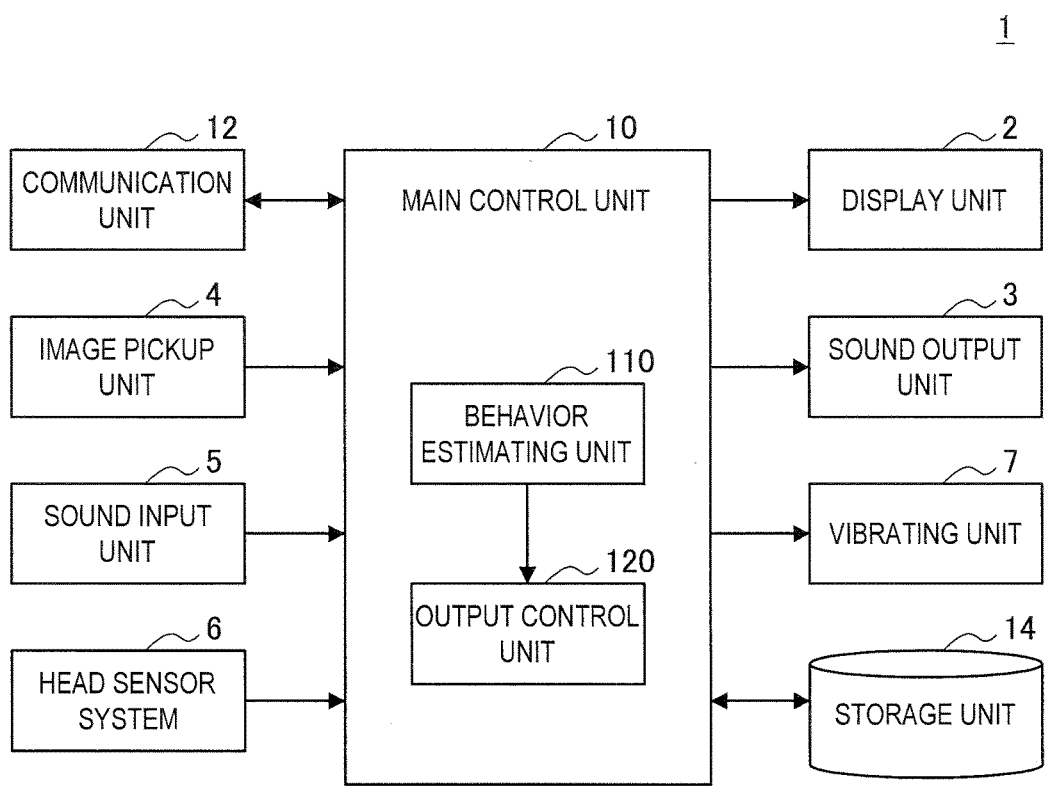
FIG. 2 is a block diagram illustrating a basic configuration of an information processing apparatus according to the embodiment.

FIG. 2 is a block diagram illustrating a basic configuration of the information processing apparatus 1 according to the present embodiment. As illustrated in FIG. 2, the information processing apparatus 1 has a main control unit 10, a display unit 2, a sound output unit 3, an image pickup unit 4, a sound input unit 5, a head sensor system 6, a vibrating unit 7, a communication unit 12 and a storage unit 14.
(Head Sensor System)

The head sensor system 6 is various types of sensors for detecting motion of the head of the user in a state where the information processing apparatus 1 is worn on the user. The head sensor system 6 is implemented with, for example, a gravity acceleration sensor 6a, a gyro sensor 6b, a geomagnetic sensor, or the like.
(Main Control Unit)

The main control unit 10 is configured with a microcomputer including, for example, a central processing unit (CPU), a read only memory (ROM), a random access memory (RAM), a non-volatile memory and an interface unit, and controls each component of the information processing apparatus 1.

Further, as illustrated in FIG. 2, the main control unit 10 according to the present embodiment functions as a behavior estimating unit 110 and an output control unit 120. The behavior estimating unit 110 estimates user behavior by comparing data detected by the head sensor system 6 which is worn on the head of the user and which detects motion of the head with a behavior characteristic amount calculated based on learning data. The behavior characteristic amount calculated based on the learning data may be acquired from the server 20 via the communication unit 12 or may be stored in advance in the storage unit 14. Here, the behavior characteristic amount is a value such as, for example, strength, dispersion and correlation analyzed based on the learning data. Further, the learning data may be teacher data or detection data of the motion of the head collected from the respective information processing apparatuses 1 worn on a number of users.

Here, one example of the data detected by the head sensor system 6 upon each behavior will be described with reference to FIG. 3 to FIG. 7. In either drawings, acceleration on the x axis (accX), acceleration on the y axis (accY) and acceleration on the z axis (accZ) detected by the gravity acceleration sensor 6a, and angular velocity on the x axis (gyrX), angular velocity on the y axis (gyrY) and angular velocity on the z axis (gyrZ) detected by the gyro sensor 6b are illustrated.

Figure 3:
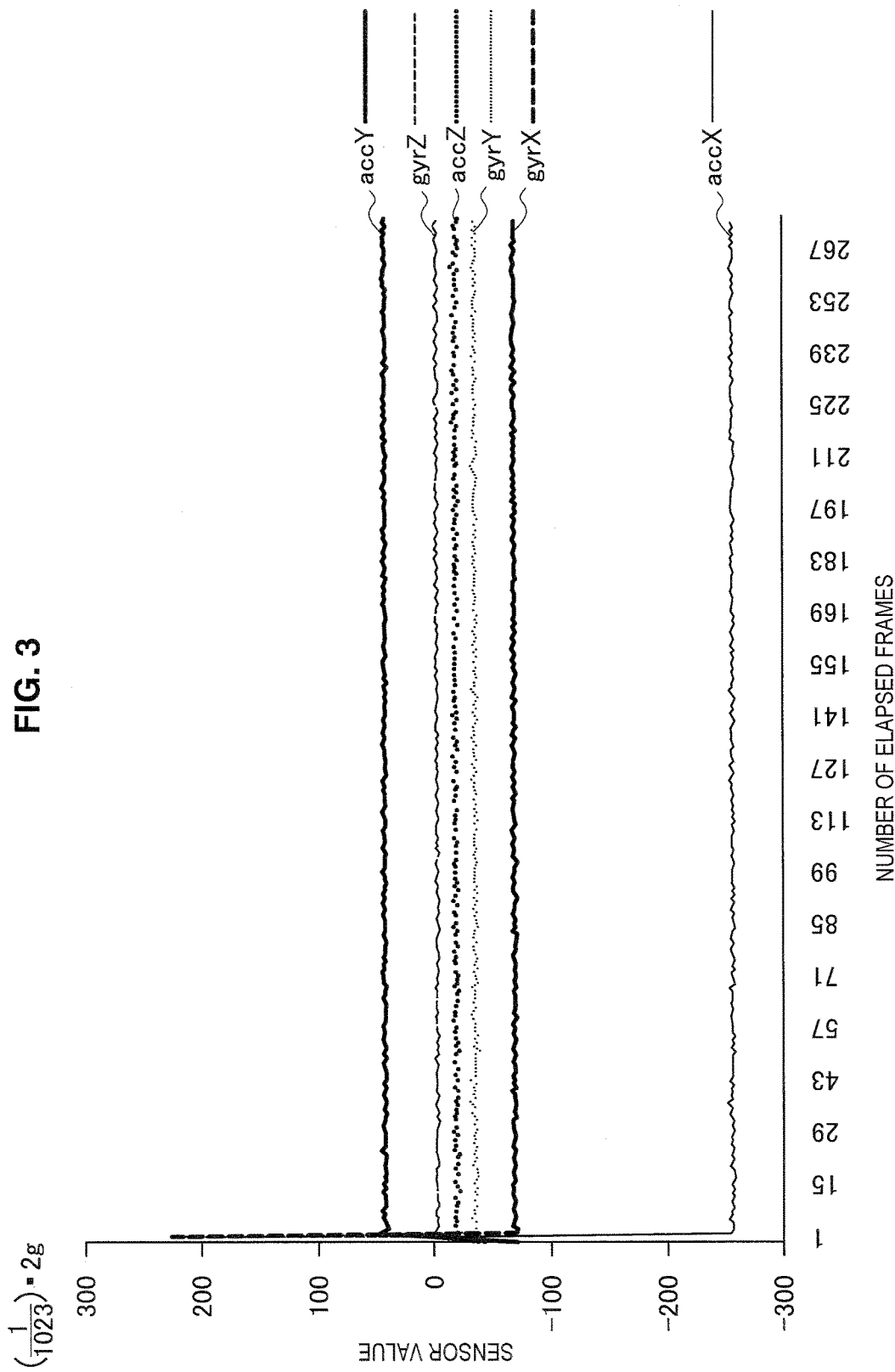
FIG. 3 is a diagram illustrating detection data of motion of the head when a user puts a glass on a desk in a rest state.

FIG. 3 is a diagram illustrating detection data of the motion of the head when the user puts a glass on a desk in a rest state. When the motion illustrated in FIG. 3 is detected, the behavior estimating unit 110 of the main control unit 10 compares the motion with the behavior characteristic amount of each behavior, and, when the motion matches the behavior characteristic amount upon behavior of putting a glass on a desk in a rest state, the behavior estimating unit 110 can estimate that the user behavior is "behavior of putting a glass on a desk in a rest state".

Figure 4:
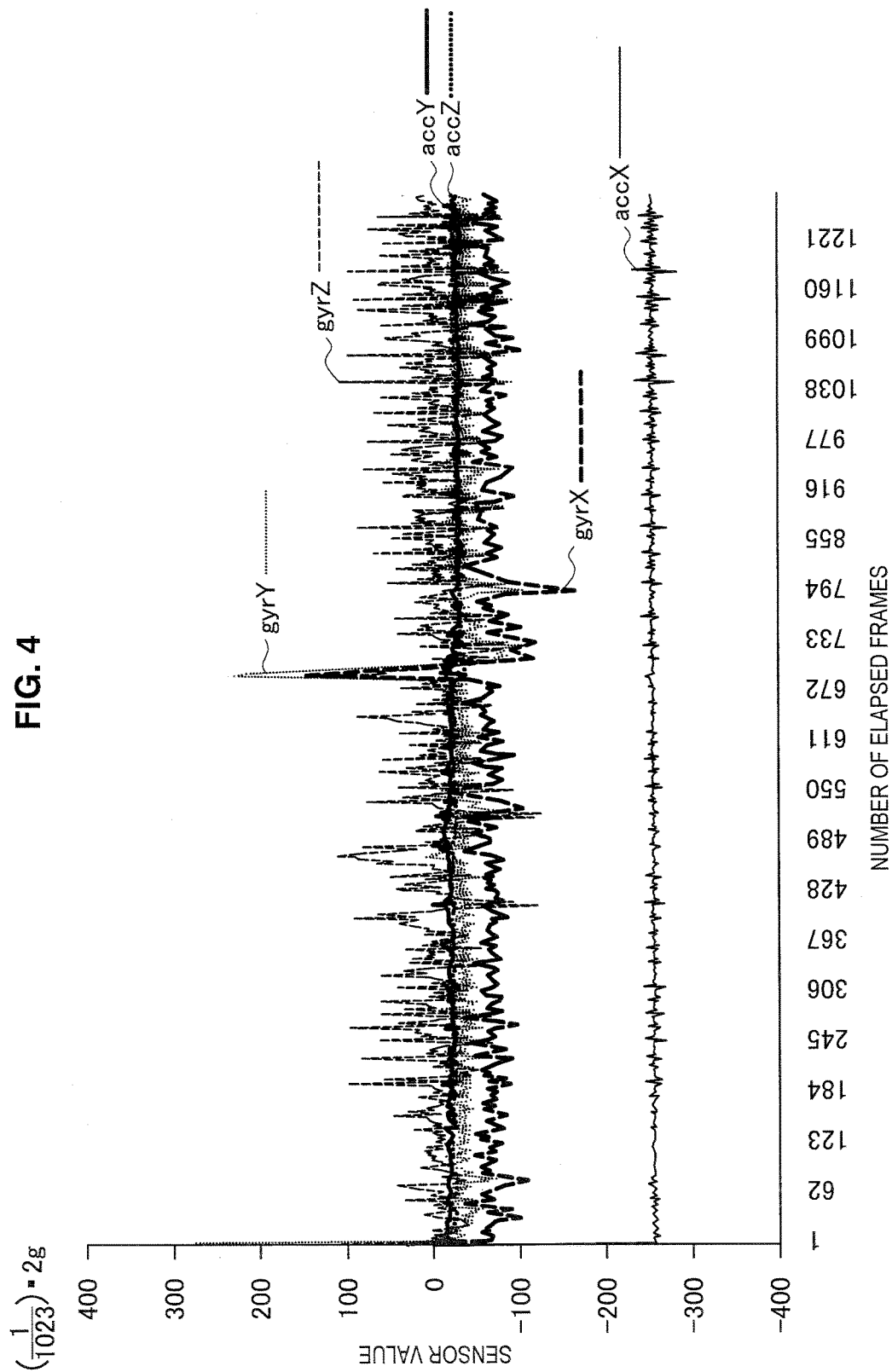
FIG. 4 is a diagram illustrating detection data of motion of the head when the user performs mastication during a meal.

FIG. 4 is a diagram illustrating detection data of the motion of the head when the user performs mastication during a meal. When the motion illustrated in FIG. 4 is detected, the behavior estimating unit 110 of the main control unit 10 compares the motion with the behavior characteristic amount of each behavior, and, when the motion matches the behavior characteristic amount upon mastication during a meal, the behavior estimating unit 110 can estimate that the user behavior is "mastication during a meal". It should be noted that, as illustrated in FIG. 4, upon mastication, periodical minute motion can be detected.

Figure 5:
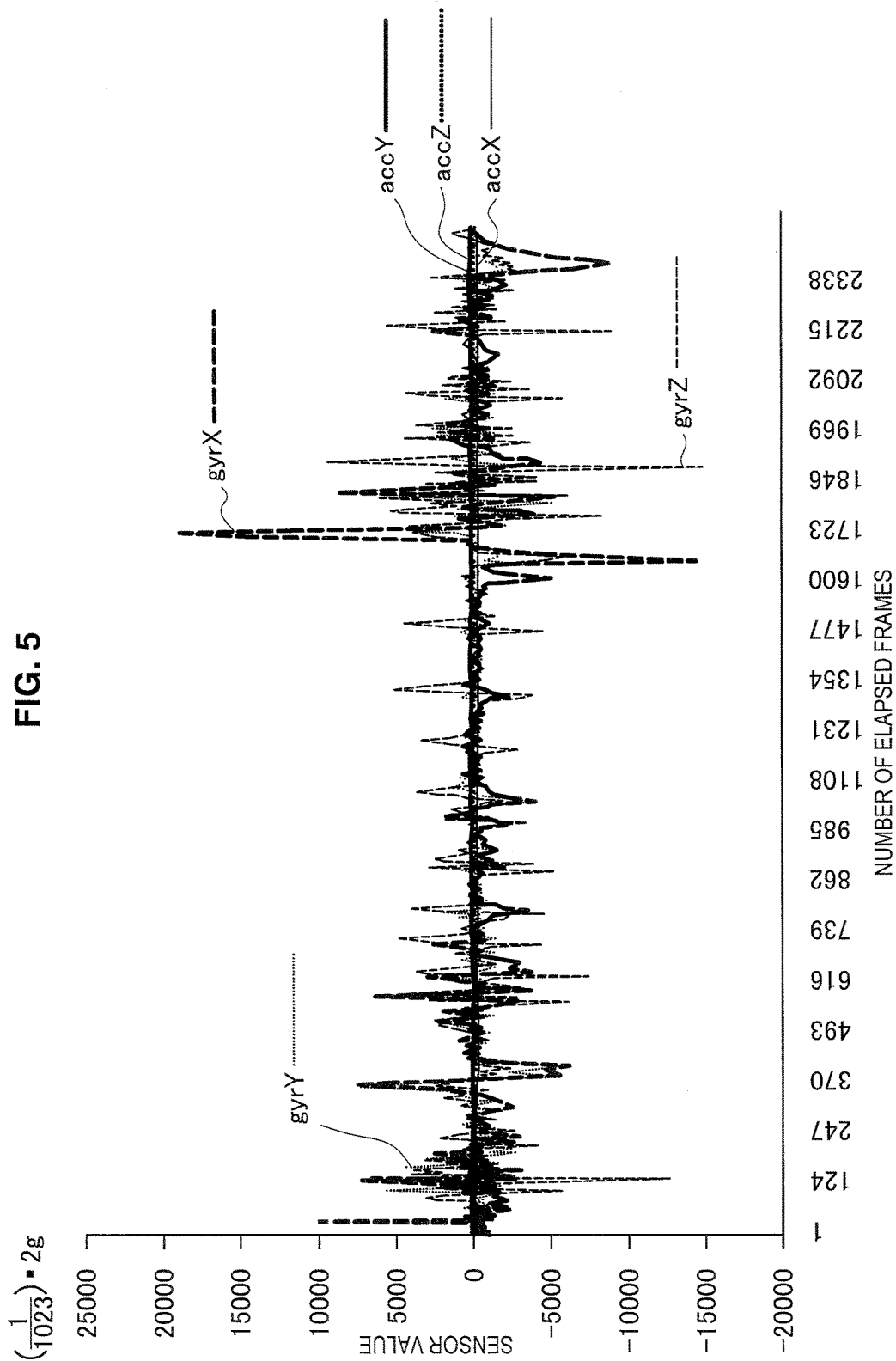
FIG. 5 is a diagram illustrating detection data of motion of the head during a conversation.

FIG. 5 is a diagram illustrating detection data of the motion of the head during a conversation. When the motion illustrated in FIG. 5 is detected, the behavior estimating unit 110 of the main control unit 10 compares the motion with the behavior characteristic amount of each behavior, and, when the motion matches the behavior characteristic amount of the motion of the head during a conversation, the behavior estimating unit 110 can estimate that the user behavior is "conversation". It should be noted that because, during a conversation, typically, the user nods, as illustrated in FIG. 5, large motion which is periodic to a certain degree can be detected.

Figure 6:
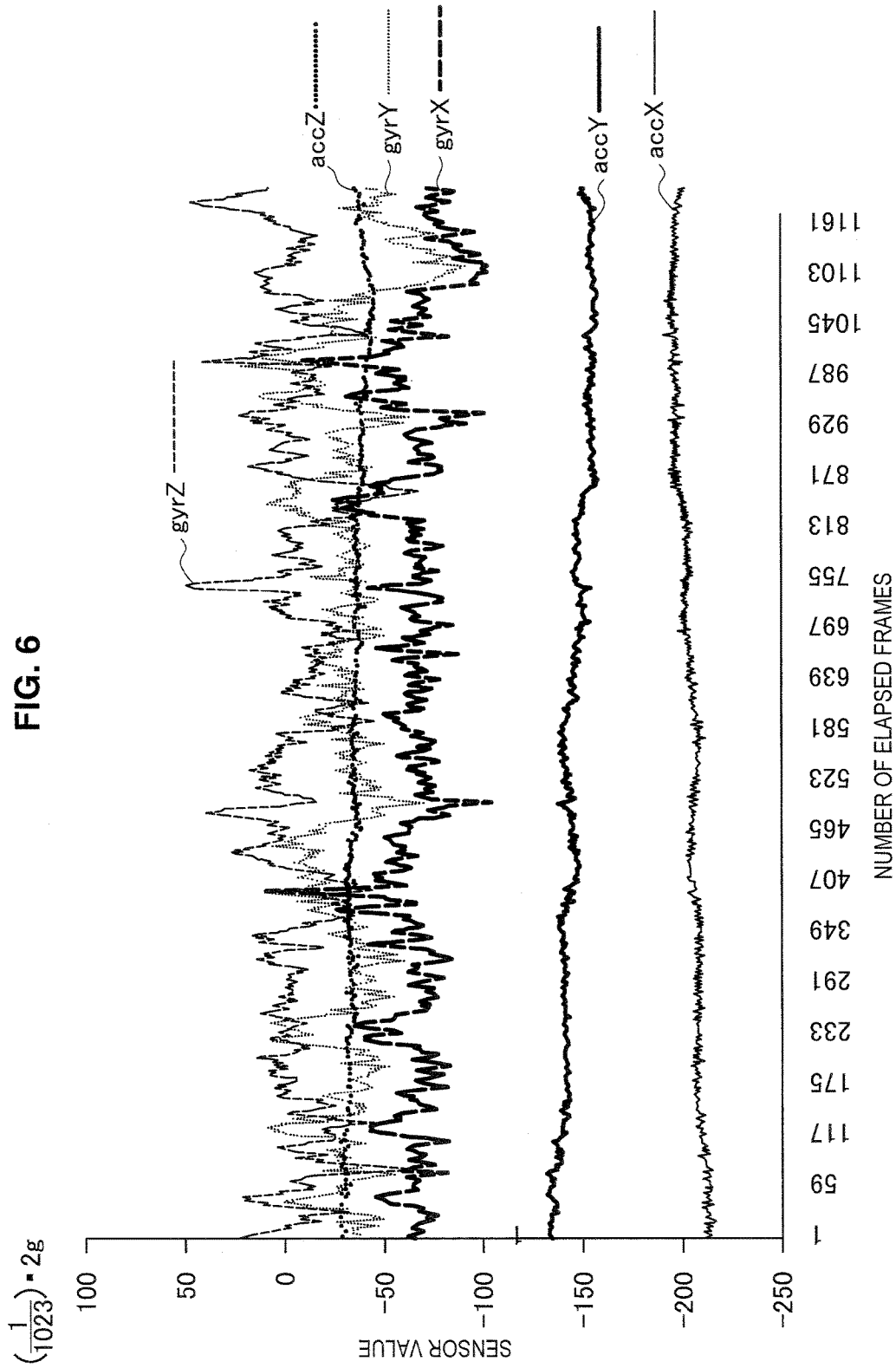
FIG. 6 is a diagram illustrating detection data of motion of the head during a catnap.

FIG. 6 is a diagram illustrating detection data of the motion of the head during a catnap. When the motion illustrated in FIG. 6 is detected, the behavior estimating unit 110 of the main control unit 10 compares the motion with the behavior characteristic amount of each behavior, and, when the motion matches the behavior characteristic amount of the motion of the head during a catnap, the behavior estimating unit 110 can estimate that the user behavior is "catnap". It should be noted that, as illustrated in FIG. 6, during a catnap, an absolute value of values of the sensor remains 200 or lower although there is minute fluctuation.

Figure 7:
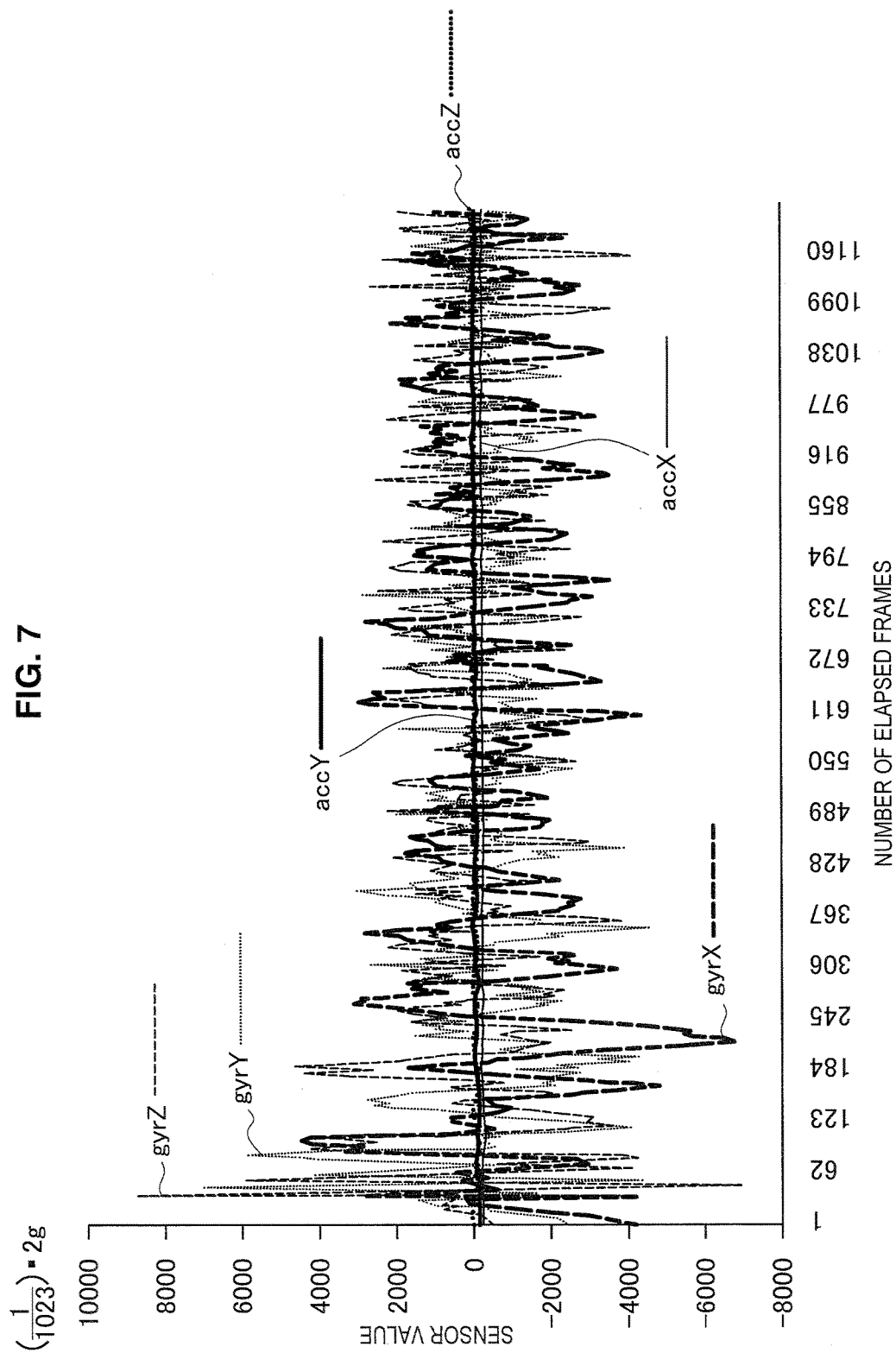
FIG. 7 is a diagram illustrating detection data of motion of the head during walking.

FIG. 7 is a diagram illustrating detection data of the motion of the head during walking. When the motion illustrated in FIG. 7 is detected, the behavior estimating unit 110 of the main control unit 10 compares the motion with the behavior characteristic amount of each behavior, and, when the motion matches the behavior characteristic amount of the motion of the head during walking, the behavior estimating unit 110 can estimate that the user behavior is "walking". It should be noted that, as illustrated in FIG. 7, during walking, periodic values can be detected in both acceleration and angular velocity.

One example of the data detected by the head sensor system 6 upon each behavior has been specifically described above. It should be noted that behavior which can be estimated by the behavior estimating unit 110 is not limited to the above-described example, and behavior such as, for example, going up or down stairs, running and walking can be estimated based on the motion of the head.

The output control unit 120 realizes avoidance of danger, activation of communication, or the like, by performing predetermined control according to the behavior estimated by the behavior estimating unit 110. The predetermined control is, for example, control of display content, sound output control, vibration control, startup control of a predetermined application, or the like.
(Communication Unit)

The communication unit 12 has a function of transmitting and receiving data by being connected to an external apparatus in a wireless/wired manner. The communication unit 12 according to the present embodiment is connected to the server 20 and receives, for example, the behavior characteristic amount calculated based on the learning data.
(Image Pickup Unit)

The image pickup unit 4 has a lens system constituted with an imaging lens 4a, a diaphragm, a zoom lens, a focus lens, or the like, a drive system which makes the lens system perform focus operation and zoom operation, a solid-state image pickup element array, or the like, for performing photoelectric conversion on an image pickup light obtained by the lens system to generate an image pickup signal. The solid-state image pickup element array may be implemented with, for example, a charge coupled device (CCD) sensor array, or a complementary metal oxide semiconductor (CMOS) sensor array.

As described above, the imaging lens 4a is disposed to face forward so as to pick up an image in a viewing direction of the user as a subject direction in a state where the information processing apparatus 1 is worn on the user. By this means, the image pickup unit 4 can pick up an image of face of the other party with whom the user is having a conversation.

(Sound Input Unit)

The sound input unit 5 which has the microphones 5a and 5b illustrated in FIG. 1, a microphone amplifying unit which performs amplification processing on a sound signal obtained through the microphones 5a and 5b, and an A/D converter, outputs sound data to the main control unit 10. The main control unit 10 recognizes sound after performing processing such as noise removal and sound source separation on the sound data obtained at the sound input unit 5, so that the user can input sound. Further, the main control unit 10 makes the storage unit 14 store the sound data after performing processing such as noise removal and sound source separation on the sound data obtained at the sound input unit 5, so that recording can be performed.

(Display Unit)

The display unit 2 displays image data according to control by the output control unit 120. Further, as described above, the display unit 2 may be a transmission type display device.

(Sound Output Unit)

The sound output unit 3 has the pair of earphone speakers 3a and 3b illustrated in FIG. 1, and amplifier circuits for the earphone speakers 3a and 3b. Further, the sound output unit 3 may be configured as a so-called bone-conduction speaker. The sound output unit 3 outputs (reproduces) sound signal data according to control by the output control unit 120.

(Vibrating Unit)

The vibrating unit 7 which has a function for vibrating the information processing apparatus 1, is implemented with, for example, an eccentric motor, a linear vibrator, a piezoelectric element, or the like. The vibrating unit 7 can call attention to the user by vibrating the information processing apparatus 1 according to control by the output control unit 120.

(Storage Unit)

The storage unit 14 stores a program, or the like, for the main control unit 10 to execute various kinds of processing. Further, the storage unit 14 may store the behavior characteristic amount calculated based on the learning data of the motion of the head.

The configuration of the information processing apparatus 1 has been described above in detail. Subsequently, a basic configuration of the server 20 will be described with reference to FIG. 8.

<202. Configuration of Server>

Figure 8:
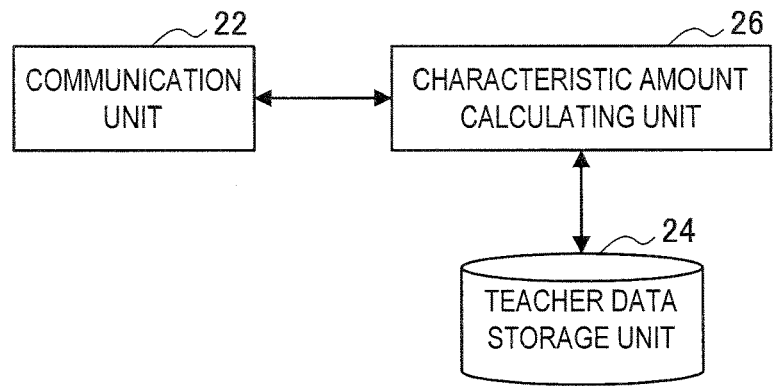
FIG. 8 is a block diagram illustrating a basic configuration of a server according to the embodiment.

FIG. 8 is a block diagram illustrating a basic configuration of the server 20 according to the present embodiment. As illustrated in FIG. 8, the server 20 has a characteristic amount calculating unit 26, a communication unit 22 and a teacher data storage unit 24.

(Communication Unit)

The communication unit 22 has a function of transmitting and receiving data by being connected to an external apparatus. The communication unit 22 according to the present embodiment is connected to the information processing apparatus 1 and transmits the characteristic amount of each behavior calculated by the characteristic amount calculating unit 26 which will be described later.

(Teacher Data Storage Unit)

The teacher data storage unit 24 stores teacher data of each behavior which can be estimated from the motion of the head.

(Characteristic Amount Calculating Unit)

The characteristic amount calculating unit 26 calculates (learns) the characteristic amount of the motion of the head upon each behavior based on learning data such as teacher data indicating the motion of the head of each behavior stored in the teacher data storage unit 24 and detection data of the motion of the head upon each behavior collected through the communication unit 22 from the information processing apparatuses 1 which are worn by a number of users. The method for calculating (learning) the characteristic amount is not particularly limited, but, for example, the characteristic amount may be analyzed using support vector machine (SVM), a decision tree, or the like. Specifically, the characteristic amount calculating unit 26 learns the characteristic amount by analyzing, for example, strength, dispersion, correlation, or the like, of the detection data (acceleration, angular velocity, or the like) of the motion of the head.

The configuration of the server 20 according to the present embodiment has been described above. Subsequently, operation processing of the behavior estimating system according to the present embodiment will be described with reference to the flowcharts illustrated in FIG. 9 and FIG. 10.

3. Operation Processing

<3-1. Characteristic Amount Learning Processing

Figure 9:
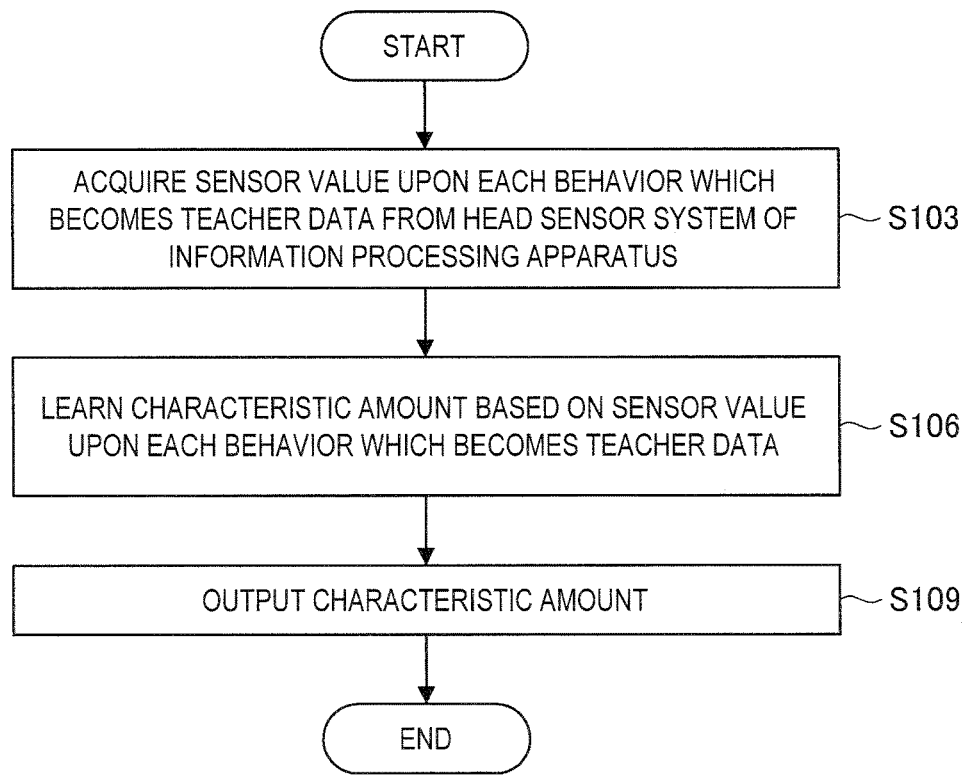
FIG. 9 is a flowchart illustrating characteristic amount learning processing according to the embodiment.

FIG. 9 is a flowchart illustrating characteristic amount learning (calculation) processing according to the present embodiment. As illustrated in FIG. 9, first, in step S103, the characteristic amount calculating unit 26 of the server 20 acquires a sensor value (detection data) upon each behavior which becomes teacher data. Specifically, for example, the characteristic amount calculating unit 26 extracts a sensor value (detection data) upon each behavior from the teacher data storage unit 24.

Then, in step S106, the characteristic amount calculating unit 26 calculates (learns) a characteristic amount based on the sensor value upon each behavior which becomes the teacher data.

Subsequently, in step S109, the characteristic amount calculating unit 26 outputs (transmits) the calculated characteristic amount to the information processing apparatus 1 worn on the head of the user. Further, the characteristic amount calculating unit 26 may store the calculated characteristic amount in a characteristic amount storage unit (not illustrated) of the server 20. In either case, the characteristic amount calculating unit 26 transmits the characteristic amount upon each behavior in response to a request from the information processing apparatus 1.

The processing of learning the characteristic amount performed before behavior estimation processing has been described above.

<3-2. Behavior Estimation Processing>

Figure 10:
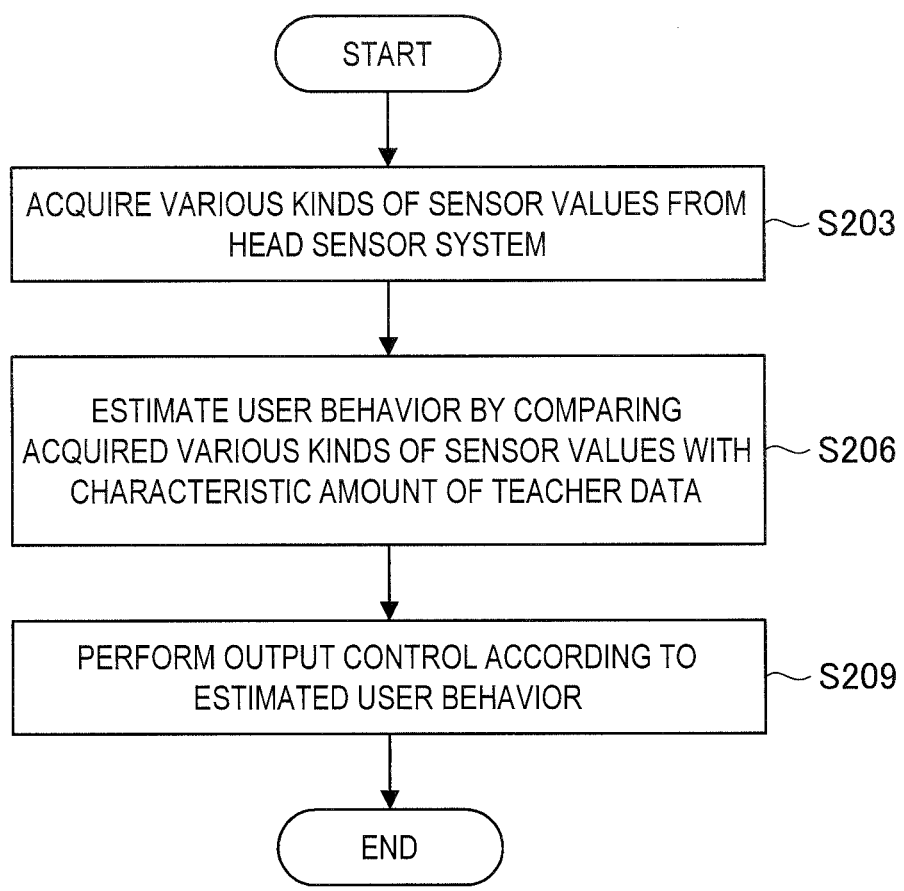
FIG. 10 is a flowchart illustrating basic behavior estimation processing according to the embodiment.

FIG. 10 is a flowchart illustrating basic behavior estimation processing according to the present embodiment. As illustrated in FIG. 10, first, in step S203, the main control unit 10 of the information processing apparatus 1 acquires various kinds of sensor values (that is, motion of the head) from the head sensor system 6 mounted on the information processing apparatus 1 which is worn on the head of the user.

Then, in step S206, the behavior estimating unit 110 compares the acquired various kinds of sensor values with the characteristic amount of the teacher data to estimate user behavior. That is, the behavior estimating unit 110 estimates the user behavior according to which characteristic amount based on teacher data of behavior matches the motion of the head of the user acquired in real time. It should be noted that when the characteristic amount of the teacher data has not been learned, the behavior estimating unit 110 can learn (learn without a teacher) the characteristic amount of each behavior using the detection data obtained by detecting the motion of the head of a number of other users, and estimate the behavior based on the learned characteristic amount.

Then, in step S209, the output control unit 120 performs predetermined output control according to the user behavior estimated by the behavior estimating unit 110. The predetermined output control is at least one of, for example, control of display content, sound output control, vibration control and startup control of a predetermined application. The output control unit 120 can realize a measure against danger occurring to the user who routinely wears the head wearable device, activation of communication, or the like, by performing the predetermined output control according to the estimated behavior.

The behavior estimation processing according to the present embodiment has been specifically described. Next, the predetermined output control described in the above-described S209 will be described using a plurality of specific examples.

4. Output Control

<4-1. Display Control for Danger Avoidance

When, for example, the behavior estimating unit 110 estimates that the user is "going up or down stairs", the output control unit 120 performs display control so that the feet are not hidden in the view of the user to realize danger avoidance. Here, one example of display control upon going up or down stairs is illustrated in FIG. 11.

The output control unit 120 normally displays a message from an acquaintance in the center of the screen as illustrated in FIG. 11 in a display screen 30 included in the view the user sees via the transmission type display unit 2.

However, because it is difficult to see the feet because the feet overlaps with characters displayed on the display screen 30, which is dangerous upon going up or down stairs, the output control unit 120 performs display control so as not to hide the feet by changing the display position to above (or changing the position after simplifying the display content if necessary).

Further, when the behavior estimating unit 110 estimates that the user is "running", the output control unit 120 performs display control so as not to cut off the view of the user to avoid danger by making the size of characters, image, or the like displayed on the display unit 2 smaller than that upon normal time (upon walking) or reducing a display area by simplifying the display content.

In this manner, it is possible to avoid danger occurring to the user who routinely wears the transmission type head wearable device through display control according to the behavior estimated in real time.

<4-2. Activation of Communication>

Subsequently, a specific example of a case where communication is activated through output control according to the estimated behavior will be described.

First, as one example of communication, there is behavior of actually having a conversation in real space. Here, an example of a display screen included in the view of the user when the user is having a conversation with a person while wearing the information processing apparatus 1 which is a glasses-type HMD on which the transmission type display unit 2 is mounted will be illustrated in FIG. 12.

As illustrated in the left part of FIG. 12, if the amount of information displayed on the display screen 32 in the transmission type display unit 2 when the user is having a conversation with a person is the same as that upon normal time, it is assumed that communication cannot be sufficiently performed with the person with whom the user is having a conversation because the displayed information disturbs the user.

Therefore, when the behavior estimating unit 110 estimates that the user is having a conversation, as illustrated in the display screen 33 in the right part of FIG. 12, the output control unit 120 prevents communication with real world to be inhibited due to the transmission type wearable device by performing control to reduce the amount of displayed information compared to that upon normal time.

Specifically, while, when notifying the user of, for example, a newly arriving e-mail, the output control unit 120 displays the number of newly arriving e-mails, a transmitter, a title, or the like, as illustrated in the display screen 32 in the left part of FIG. 12 upon normal time, the output control unit 120 displays only characters of "newly arriving e-mail" as illustrated in the display screen 33 in the right part of FIG. 12 when the user is having a conversation. Alternatively, by displaying only an icon or displaying nothing, it is possible to prevent communication in real world to be inhibited.

While the method for activating communication by reducing the amount of information has been described above, the present embodiment is not limited to this, and, for example, it is also possible to activate communication by, for example, control of the display position of the information. This will be specifically described below with reference to FIG. 13.

FIG. 13 is a diagram for explaining a case where communication is activated through control of the display position. In the example illustrated in the left part of FIG. 13, the display position of the information displayed on the display screen 34 included in the view of the user is controlled to be located at a fixed position. In this case, even when the face of the other party with whom the user is having a conversation moves, as illustrated in the display screen 35, the display position of the information is not changed from the fixed position. In this manner, by always displaying the information at a fixed position, the user can achieve a sense of ease that the user can always obtain information by turning his/her eyes to a determined position.

However, there can arise a case where it is difficult to perform communication because the displayed information overlaps with the face of the other party depending on the position of the face of the other party.

Therefore, as an alternative method, there is a possible method of recognizing the position of the face of the other party with whom the user is having a conversation and controlling the display position of the displayed information so as not to overlap with the face of the other party. The position of the face of the other party is recognized based on a picked up image picked up by the image pickup unit 4 using, for example, the imaging lens 4a (see FIG. 1) provided at the information processing apparatus 1 to face outside.

Specifically, first, when the behavior estimating unit 110 estimates that the user is having a conversation, the main control unit 10 starts image pickup by the image pickup unit 4, recognizes the face based on the picked up image and recognizes the position of the face of the other party with whom the user is having a conversation.

Subsequently, the output control unit 120 performs control so that the display position of the information displayed at the display unit 2 does not overlap with the face of the other party the user sees via the display unit 2 according to the position of the face recognized based on the picked up image. Further, the output control unit 12 changes the display position of the information in accordance with change of the position of the face of the other party based on picked up images continuously picked up by the image pickup unit 4. By this means, as illustrated in the display screens 36 and 37 in the right part of FIG. 13, even when the position of the face of the other party with whom the user is having a conversation changes, the display position of the information is always controlled so as not to overlap with the face of the other party, so that it is possible to realize activation of communication.

It should be noted that while display control when the user is having a conversation with a person the user faces in real space has been described in the above-described activation of communication, the present embodiment is not limited to this, and, for example, the present embodiment can be applied in a similar manner to a case where a focusing target of the user is an object other than a person. Specifically, when the behavior estimating unit 110 estimates that the user is operating a terminal such as a PC and a smartphone or watching TV, the output control unit 120 performs control to reduce the information amount or display information so as not to overlap with the terminal of the focusing target or a screen of TV.

By this means, also when the user who routinely wears the head wearable device (information processing apparatus 1) behaves while focusing attention on an object other than a person, it is possible to improve user-friendliness of the information processing apparatus 1 by performing display control so as not to cut off the view of the user.

<4-3. Application to Application Program>

Further, the output control unit 120 according to the present embodiment may perform control to start a predetermined application according to the estimated behavior. Specifically, for example, when the behavior estimating unit 110 estimates that the user is "taking a nap", the output control unit 120 starts an application of preventing a catnap. According to such an application, the output control unit 120 can encourage the user to wake up by, for example, turning on the vibrating unit 7 to vibrate the user.

When the behavior estimating unit 110 estimates that the user "wakes up", the output control unit 120 turns off the vibrating unit 7 to complete the application for preventing a catnap.

Further, an application started when it is estimated that the user is taking a nap in advance may be, for example, a power saving application, a video application, or the like, in addition to the above-described application for preventing a catnap.

When the power saving application is started in response to a catnap, the output control unit 120 performs control to power off the display unit 2, make the power supply of the information processing apparatus 1 transition to a sleep mode, or the like, so as to reduce power consumption while the user is taking a nap.

Further, when the video application is started in response to a catnap, the output control unit 120 records a state around the user while the user is taking a nap by picking up an image around the user using the image pickup unit 4 and recording sound around the user using the sound input unit 5.

While the above-described application is one example of applications started when it is estimated that the user is taking a nap, the user may set in advance which application should be started.

Further, the estimated behavior is not limited to "catnap", and, for example, when it is estimated that the user is "having a meal", the output control unit 120 may start a healthcare application set in advance. According to such an application, the output control unit 120 can display notification such as, for example, "be careful of overeating" at the display unit 2 to give a warning to the user.

Further, when the healthcare application is started, the behavior estimating unit 110 estimates mastication behavior based on the motion of the head, and the output control unit 120 may count the number of times of mastication behavior and output data regarding the number of times of mastication to the healthcare application.

As described above, the output control unit 120 according to the present embodiment can automatically start a predetermined application according to the estimated behavior, so that it is possible to improver user-friendliness of the information processing apparatus 1.

5. Conclusion

As described above, the information processing apparatus 1 according to the embodiment of the present disclosure is worn on the head of the user and can estimate user behavior more robustly based on characteristic motion of the head of the user.

Further, how the information processing apparatus 1 worn on the head is held (worn) is not different depending on persons, it is possible to commonly utilize the characteristic amounts based on motion of each behavior which becomes teacher data in the respective information processing apparatuses 1 worn on a plurality of users. Further, it is possible to solve a problem in the related art of an amount of learning data being vast when how the smartphone, or the like, is held is different depending on persons.

Further, because the information processing apparatus 1 according to the present embodiment automatically performs predetermined output control according to the estimated behavior, it is possible to realize a measure against danger occurring to the user who routinely wears the head wearable device, activation of communication, or the like.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is possible to create a computer program for causing hardware such as the CPU, ROM, RAM, or the like, incorporated in the above described information processing apparatus 1, to exhibit functions of the information processing apparatus 1. Further, there is provided a computer-readable storage medium having the computer program stored therein.

Further, while in the above-described embodiment, the teacher data storage unit 24 and the characteristic amount calculating unit 26 are provided at the server 20, and the behavior estimating unit 110 and the output control unit 120 are provided at the information processing apparatus 1, the present technique is not limited to this example. For example, all these components may be provided at the server 20, or provided at the information processing apparatus 1.

Further, while in the above-described embodiment, all of the display unit 2, the head sensor system 6 and the main control unit 10 are provided at the wearable device (information processing apparatus 1) worn on the head, the present technique is not limited to this example. For example, among these components, the display unit 2 and the head sensor system 6 may be provided at the wearable device worn on the head, and the main control unit 10 may be provided at a smartphone, a mobile phone terminal, a personal digital assistant (PDA), a table terminal, or the like, held by the user.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)
An information processing apparatus including:
an estimating unit configured to estimate behavior of a user by comparing data detected by a detecting unit worn on a head of the user and configured to detect motion of the head with a behavior characteristic amount calculated based on learning data; and
a control unit configured to perform control according to the behavior estimated by the estimating unit.

(2)
The information processing apparatus according to (1),
wherein the estimating unit estimates the behavior of the user by comparing the detected data with a behavior characteristic amount calculated in advance based on teacher data.

(3)
The information processing apparatus according to (1) or (2),
wherein the control unit performs output control according to the estimated behavior.

(4)
The information processing apparatus according to (3),
wherein the output control is at least one of control of display content, sound output control, vibration control and startup control of a predetermined application.

(5)
The information processing apparatus according to any one of (1) to (4),
wherein the behavior characteristic amount is a value of strength, dispersion or correlation analyzed based on the learning data.

(6)
The information processing apparatus according to any one of (1) to (5),
wherein the detecting unit is at least one of a gyro sensor, an acceleration sensor and a geomagnetic sensor.

(7)
The information processing apparatus according to any one of (1) to (6), further including:
a transmission type display unit configured to be disposed in front of eyes of the user when the information processing apparatus is worn on the head of the user.

(8)
The information processing apparatus according to any one of (1) to (7),
wherein the control unit controls display content of a transmission type display unit disposed in front of eyes of the user according to the behavior estimated by the estimating unit when the information processing apparatus is a wearable device worn on the head of the user.

(9)
The information processing apparatus according to any one of (1) to (8),
wherein the control unit performs control to start an application associated in advance with the behavior estimated by the estimating unit.

(10)
A control method including:
a step of estimating behavior of a user by comparing data detected by a detecting unit worn on a head of the user and configured to detect motion of the head with a behavior characteristic amount calculated based on learning data; and
a step of performing control according to the estimated behavior.

(11)
A program for causing a computer to function as:
an estimating unit configured to estimate behavior of a user by comparing data detected by a detecting unit worn on a head of the user and configured to detect motion of the head with a behavior characteristic amount calculated based on learning data; and
a control unit configured to perform control according to the behavior estimated by the estimating unit.

REFERENCE SIGNS LIST

1 information processing apparatus
2 (2*a*, 2*b*) display unit
3 sound output unit
3*a*, 3*b* earphone speaker
4 image pickup unit
4*a* imaging lens
5 sound input unit
5*a*, 5*b* microphone
6 head sensor system
6*a* gravity acceleration sensor
6*b* gyro sensor
7 vibrating unit
10 main control unit
110 behavior estimating unit
120 output control unit
12 communication unit
14 storage unit
20 server
22 communication unit
24 teacher data storage unit
26 characteristic amount calculating unit

The invention claimed is:
1. A head mounted display, comprising:
an imaging device configured to acquire image data of a surrounding environment of the head mounted display;
a sensor configured to acquire motion data of the head mounted display;

a display unit configured to initiate display of content, wherein the display unit is at least partially transparent, the content indicates that a new notification has arrived, and the new notification includes at least one of a transmitter information or a title information of the new notification; and at least one processor configured to:
 determine, based on the motion data, whether a state of the head mounted display is a stable state or a non-stable state, wherein a sensor value of the motion data in the non-stable state is larger than a sensor value in the stable state;
 determine, when the state of the head mounted display is the non-stable state, whether the image data includes a face image of a second user, wherein the second user is different from a first user of the head mounted display;
 control the display unit to initiate, when the new notification has arrived, display of the at least one of the transmitter information or the title information at a first information amount based on determination that the image data does not include the face image of the second user; and
 control the display unit to initiate, when the new notification has arrived, display of the at least one of the transmitter information or the title information at a second information amount less than the first information amount based on determination that the image data includes the face image of the second user.

2. The head mounted display according to claim 1, wherein the at least one processor is further configured to determine a behavior of the first user based on a comparison of the acquired motion data with a behavior characteristic amount, wherein the behavior characteristic amount is based on teacher data, wherein the teacher data is based on a corresponding behavior characteristic amount associated with a plurality of users, and wherein the plurality of users include the first user.

3. The head mounted display according to claim 1, wherein the sensor is at least one of a gyro sensor, an acceleration sensor, or a geomagnetic sensor.

4. The head mounted display according to claim 1, wherein the at least one processor is further configured to determine a behavior based on a comparison of the acquired motion data with a behavior characteristic amount, wherein the behavior characteristic amount is based on learning data.

5. The head mounted display according to claim 1, wherein the at least one processor is further configured to determine a behavior based on the acquired motion data which indicates that the first user nods.

6. The head mounted display according to claim 1, wherein the stable state includes a state where the head mounted display is put on a surface of the surrounding environment.

7. A control method for a head mounted display, comprising:
 acquiring, by an imaging device, image data of a surrounding environment of the head mounted display
 acquiring, by a sensor, motion data of the head mounted display;
 controlling a display unit of the head mounted display to initiate display of content, wherein the content indicates that a new notification has arrived, and the new notification includes at least one of a transmitter information or a title information of the new notification;
 determining, based on the motion data, whether a state of the head mounted display is a stable state or a non-stable state, wherein a sensor value of the motion data in the non-stable state is larger than a sensor value in the stable state;
 determining, when the state of the head mounted display is the non-stable state, whether the image data includes a face image of a second user, wherein the second user is different from a first user of the head mounted display;
 controlling the display unit to initiate, when the new notification has arrived, display of the at least one of the transmitter information or the title information at a first information amount based on determination that the image data does not include the face image of the second user; and
 controlling the display unit to initiate, when the new notification has arrived, display of the at least one of the transmitter information or the title information at a second information amount less than the first information amount based on determination that the image data includes the face image of the second user.

8. A non-transitory computer-readable medium having stored thereon computer-readable instructions, which when executed by a computer, cause the computer to execute operations, the operations comprising:
 acquiring, by an imaging device, image data of a surrounding environment of a head mounted display
 acquiring, by a sensor, motion data of the head mounted display;
 controlling a display unit of the head mounted display to initiate display of content, wherein the content indicates that a new notification has arrived, and the new notification includes at least one of a transmitter information or a title information of the new notification;
 determining, based on the motion data, whether a state of the head mounted display is a stable state or a non-stable state, wherein a sensor value of the motion data in the non-stable state is larger than a sensor value in the stable state;
 determining, when the state of the head mounted display is the non-stable state, whether the image data includes a face image of a second user, wherein the second user is different from a first user of the head mounted display;
 controlling the display unit to initiate, when the new notification has arrived, display of the at least one of the transmitter information or the title information at a first information amount based on determination that the image data does not include the face image of the second user; and
 controlling the display unit to initiate, when the new notification has arrived, display of the at least one of the transmitter information or the title information at a second information amount less than the first information amount based on determination that the image data includes the face image of the second user.

* * * * *